United States Patent [19]

Travis

[11] Patent Number: 4,642,948

[45] Date of Patent: Feb. 17, 1987

[54] TENSION RETENTION ANCHORAGE

[76] Inventor: William B. Travis, 10021 Caribou Trail, Dallas, Tex. 75238

[21] Appl. No.: 663,470

[22] Filed: Oct. 18, 1984

[51] Int. Cl.[4] ............................ E04H 1/04; B64G 1/10
[52] U.S. Cl. .............................. 52/79.13; 52/223 R; 244/159; 248/449; 248/611
[58] Field of Search .............. 52/79.7, 167, 223 R, 52/79.13, 79.1, 79.2, 79.3, 637, 646, 638, 108; 248/610, 503, 611, 589, 581, 499; 220/901, 1 B, 3, 4 C, 4 D, 23.6; 206/509, 508, 503, 501; 244/159

[56] References Cited

U.S. PATENT DOCUMENTS

| 2,213,738 | 9/1940 | Larsen | 248/499 |
|---|---|---|---|
| 3,139,957 | 7/1964 | Fuller | 52/83 |
| 3,204,911 | 9/1965 | Lawrence | 248/611 |
| 3,592,422 | 7/1971 | Paine | 248/589 |
| 3,977,140 | 8/1976 | Matsudaira | 52/167 |
| 4,008,669 | 2/1977 | Sumrell | 248/499 |
| 4,073,101 | 2/1978 | Yoshida | 52/79.1 |
| 4,074,476 | 2/1978 | Ordorika | 52/79.2 |

FOREIGN PATENT DOCUMENTS

| 485086 | 5/1969 | Switzerland | 52/83 |
|---|---|---|---|
| 312808 | 6/1929 | United Kingdom | 248/610 |
| 1107309 | 3/1968 | United Kingdom | 248/610 |

Primary Examiner—John E. Murtagh
Attorney, Agent, or Firm—Richards, Harris, Medlock & Andrews

[57] ABSTRACT

An apparatus comprising only tension-bearing members serves to interconnect first and second bodies and carry both tension and compressive forces between the bodies. A first tension-bearing member, such as a cable, is connected between first and second points of a first body and connected to a first point of a second body at a location along the tension-bearing member between the connections to the first and second parts of the first body. The first tension-bearing member carries tension forces to oppose the first and second bodies from moving together. A second tension-bearing member, such as a second cable, is connected between the first and second bodies for carrying a tension force to oppose the first and second bodies from moving apart. The combination of the two tension-bearing members serves to carry both the tension and compressive forces between the two bodies.

6 Claims, 6 Drawing Figures

TENSION RETENTION ANCHORAGE

TECHNICAL FIELD

The present invention pertains in general to mechanical fastening apparatus and in particular to such apparatus which carries only tension loading.

BACKGROUND OF THE INVENTION

It has been the traditional practice to couple bodies by rigid beam members to carry both tension and compression loads. Only under special circumstances can tension members alone be utilized to carry all the necessary loads between bodies. Such an application is typically a pure suspension configuration serving only to carry gravity loads.

In many applications it would be preferable to eliminate rigid connecting members which serve as the tension and compression load-bearing members between bodies. It has heretofore not been possible to eliminate such rigid members when compressive strength is required along with tension strength. It is therefore the object of the present invention to provide an apparatus for interconnecting two bodies with tension members only, but carrying which both support and anchor the two bodies against tension and compressive forces acting between the two bodies.

SUMMARY OF THE INVENTION

A selected embodiment of the present invention comprises an apparatus for connecting first and second bodies only with tension members, which support and anchor the bodies against both tension and compressive forces acting between the bodies. The apparatus includes a first tension-bearing element, such as a flexible cable, connected between at least first and second points of the first body and connected to a first point of the second body at a location along the first tension-bearing element between the connections to the first and second points of the first body. The first tension-bearing element carries tension forces to oppose the first and second bodies from moving together. A second tension-bearing element, which may also be a cable, is connected between the first and second bodies for carrying a tension force to oppose the first and second bodies from moving apart. The use of both of the tension-bearing elements provides both tension and compressive loading between the two bodies.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
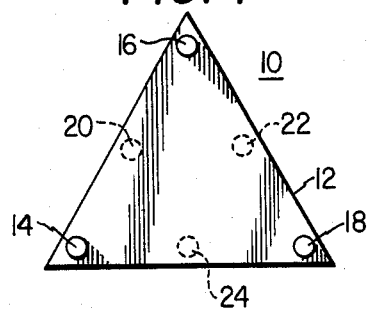
FIG. 1 is a plan view of a triangular plate having three upstanding members on each side.
Figure 2:
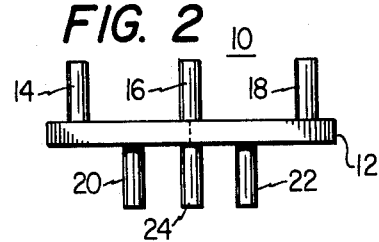
FIG. 2 is an elevation view of the triangular plate shown in FIG. 1.

Referring now to FIGS. 1 and 2 there is illustrated a body 10 which can be utilized in accordance with the present invention. The body 10 includes a triangular plate 12 which has upstanding, cylindrical members 14, 16 and 18 located respectively at the points of the triangular plate 12. Downwardly extending members 20, 22 and 24 are mounted respectively along the edges and center portions of the sides of the triangular plate 12.

Figure 3:
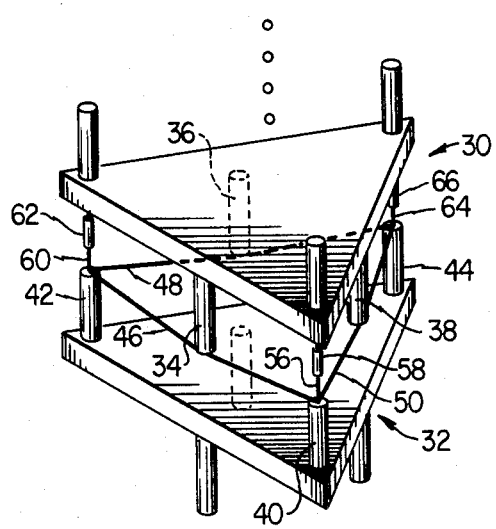
FIG. 3 is a perspective view of two of the triangular plates shown in FIGS. 1 and 2 interconnected by means of first and second tension-bearing members in accordance with the present invention.

Referring now to FIG. 3 there is shown two of the bodies 10 from FIGS. 1 and 2, and which are designated by the reference numerals 30 and 32. Body 30 has upstanding cylindrical members 34, 36 and 38. Body 32 has upstanding members 40, 42 and 44.

A tension-bearing cable 46 is connected between the free ends of members 40 and 42. A cable 48 is connected between the ends of members 42 and 44. A cable 50 is connected between the ends of members 44 and 40. The end of member 34 is connected to the central portion of the cable 46. The end of the member 36 is connected to the central portion of the cable 48. Likewise the end of the member 38 is connected to the mid-point of the cable 50.

A cable 56 is connected between the top end of member 40 and the bottom of the plate portion of body 30. The cable 56 includes a tension control element 58, such as a turnbuckle. A cable 60 is connected between the top end of member 42 and the plate portion of body 30 and includes a tension control element 62. A cable 64 is connected between the member 44 and the plate portion of body 30 and includes a tension control element 66.

The tension control elements 58, 62 and 66 are tightened such that the members 34, 36 and 38 are driven downward to deflect the respective cables 46, 48 and 50. As the cables 46, 48 and 50 are tensioned they carry any compressive forces which serve to drive the bodies 30 and 32 together. The cables 56, 60 and 66 are in tension and serve to pull the bodies 30 and 32 together. Thus, the two sets of cable members are in force opposition and thereby establish an equilibrium connection between the bodies 30 and 32 to carry both tension and compressive forces acting between the bodies.

The total assembly shown in FIG. 3, which includes the bodies 30 and 32 can be extended indefinitely by adding additional ones of the body 10 on either the top or the bottom of the illustrated assembly.

A particular application of the assembly shown in FIG. 3 is for the use of energy absorption. Should the assembly be subjected to either tension or compressive forces the cables will undergo additional tension and can be subjected to either elastic or inelastic extension for energy absorption.

Figure 4:
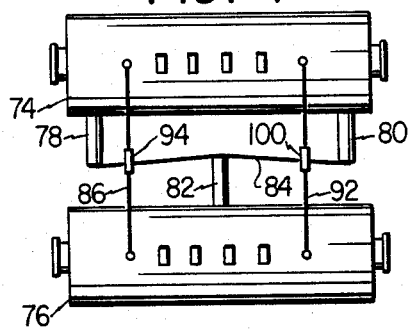
FIG. 4 is an elevation illustration of first and second spacecraft modules interconnected by tension-bearing means in accordance with the present invention to form a space station.
Figure 5:
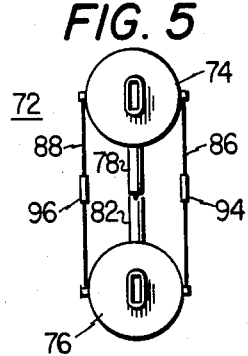
FIG. 5 is an end view of the space station shown in FIG. 4.
Figure 6:
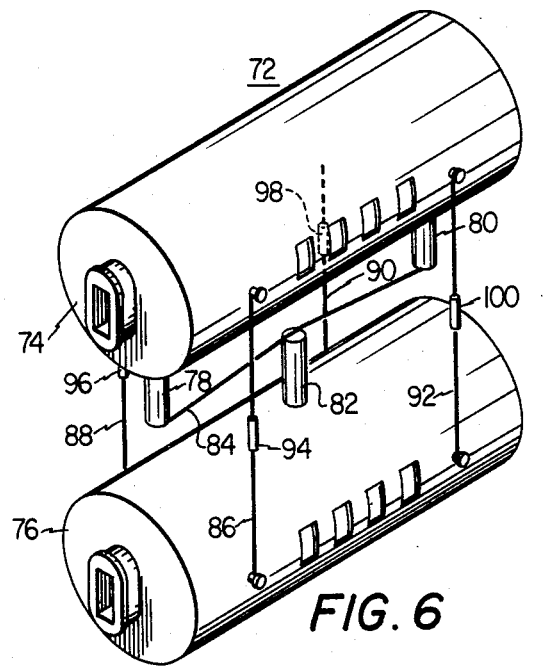
FIG. 6 is a perspective view of the space station shown in FIGS. 4 and 5 illustrating the tension-bearing interconnecting apparatus of the present invention.

A further application of the present invention is illustrated in FIGS. 4 through 6. In each of the FIGS. 4 through 6 there is illustrated a space station 72 which comprises modules 74 and 76. The present invention is utilized to provide a nonrigid interconnection between the modules 74 and 76 to maintain constant spacing between the modules. The separation is maintained between the modules 74 and 76 such that any forces are counteracted which tend to drive the modules together or apart. The modules are interconnected only by tension-bearing elements, such as flexible cables.

Further referring to FIGS. 4-6 the module 74 has downward extending rigid members 78 and 80 and module 76 has a single upward extending rigid member 82.

A cable 84 is connected between the free ends of the members 78 and 80 and is connected at its center point to the free end of the member 82. Cables 86, 88, 90 and 92 are connected between ends on the sides of the modules 74 and 76. Tension control elements, 94, 96, 98 and 100, such as motor-driven cable reels, are connected respectively to the cables 86, 88, 90 and 92.

The members 78, 80 and 82 are parallel and coplanar in the illustrated embodiment.

In operation, referring to FIGS. 4, 5 and 6, the tension control elements 94, 96, 98 and 100 are operated to draw tension on the cables 86, 88, 90 and 92 to produce a force for drawing together the modules 74 and 76. In doing so the member 82 is driven toward the module 74 thereby stretching the cable 84 and placing it in tension. The tension on the various cables is brought into equilibrium to establish a static relationship between the modules 74 and 76.

The space station 72 can be expanded by adding any number of additional modules which can be interconnected within the space station by use of the interconnecting assembly of the present invention. Such an interconnection as described provides a light-weight but strong load-bearing apparatus for interconnecting the space station modules.

In summary, the present invention comprises an apparatus for interconnecting two bodies to carry both tension and compressive forces while the interconnecting assembly comprises only tension-bearing members.

Although several embodiments of the invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the scope of the invention.

I claim:

1. Apparatus operative independent of gravity of connecting first and second bodies to carry both tension and compressive forces between said bodies, comprising:
   a first flexible tension bearing means connected between first and second points of said first member,
   a projecting compressive member joined to said second body and mated to said first tension bearing means between said first and second points and directed toward said first body for deflecting said first tension bearing means toward said first body whereby a tension force is applied to said first tension bearing member and a compressive force is applied to said compressive member to oppose said first and second members from moving together,
   a second flexible tension bearing means connected between said first and second bodies for carrying a tension force to oppose said first and second bodies from moving apart,
   said first and second tension bearing means being cables, and
   means for selectively adjusting the tension on said second tension bearing means.

2. Apparatus as recited in claim 1 including first and second upstanding members each connected at a first end thereof to said first body and having the second ends thereof serving as said first and second points for connection to said first tension bearing means.

3. Apparatus operative independent of gravity for connecting first and second bodies to carry both tension and compressive forces between said bodies, comprising:
   two offset projecting compressive members connected to said first body,
   a first cable connected between said two offset projecting members,
   an outward projecting member connected to said second body, directed toward said first body and mated to said first cable for deflecting said first cable toward said first body thereby placing said first cable in tension when said first and second bodies are moved together,
   at least one second cable connecting said first and second bodies and placed in tension when said bodies are moved apart, and
   means for selectively adjusting the tension force on said second cable.

4. Apparatus as recited in claim 3 wherein said projecting members are parallel.

5. Apparatus as recited in claim 3 wherein said projecting members are coplanar.

6. A space station, comprising:
   a first body,
   a second body,
   a first flexible tension bearing means connected between first and second points of said first body,
   a projecting compressive member joined to said second body and mated to said first tension bearing means between said first and second points and directed toward said first body for deflecting said first tension bearing means toward said first body whereby a tension force is applied to said first tension bearing member and a compressive force is applied to said compressive member to oppose said first and second members from moving together, and
   a second flexible tension bearing means connected between said first and second bodies for carrying a tension force to oppose said first and second bodies from moving apart, and
   the first and second flexible tension bearing means opposing relative movement between the first and second bodies independent of gravity.

* * * * *